United States Patent [19]
Yamasaki

[11] Patent Number: 5,357,491
[45] Date of Patent: Oct. 18, 1994

[54] CLOCK SELECTION CONTROL DEVICE
[75] Inventor: Hiroshi Yamasaki, Kawasaki, Japan
[73] Assignee: Fujitsu Limited, Kawasaki, Japan
[21] Appl. No.: 189,037
[22] Filed: Jan. 31, 1994
[30] Foreign Application Priority Data
  Sep. 8, 1993 [JP]  Japan .................. 5-223221
[51] Int. Cl.5 .......................... G04F 5/00; G04F 1/04
[52] U.S. Cl. ........................... 368/156; 371/61; 379/279
[58] Field of Search ................... 368/19, 155, 156; 331/49; 371/8, 61, 62; 379/279, 284

[56] References Cited
U.S. PATENT DOCUMENTS

| 4,254,492 | 3/1981 | McDermott, III | 368/119 |
| 4,322,580 | 3/1982 | Khan et al. | 179/18 EE |
| 4,490,581 | 12/1984 | Edwards et al. | 179/18 EE |
| 4,538,272 | 8/1985 | Edwards et al. | 371/61 |
| 4,653,054 | 3/1987 | Liu et al. | 371/61 |
| 5,291,528 | 3/1994 | Vermeer | 375/106 |

Primary Examiner—Vit W. Miska

[57] ABSTRACT

A clock stoppage detector and a selector selection determining circuit are provided on each of a plurality of circuit boards. If any abnormality is detected in the clock selected in accordance with selector control information supplied from a clock selection controller provided common to the plurality of circuit boards, the selector selection determining circuit changes the selection independently of the selection control information. The selector selection determining circuit also performs clock selection independently when failure occurs to the clock selection controller.

7 Claims, 3 Drawing Sheets

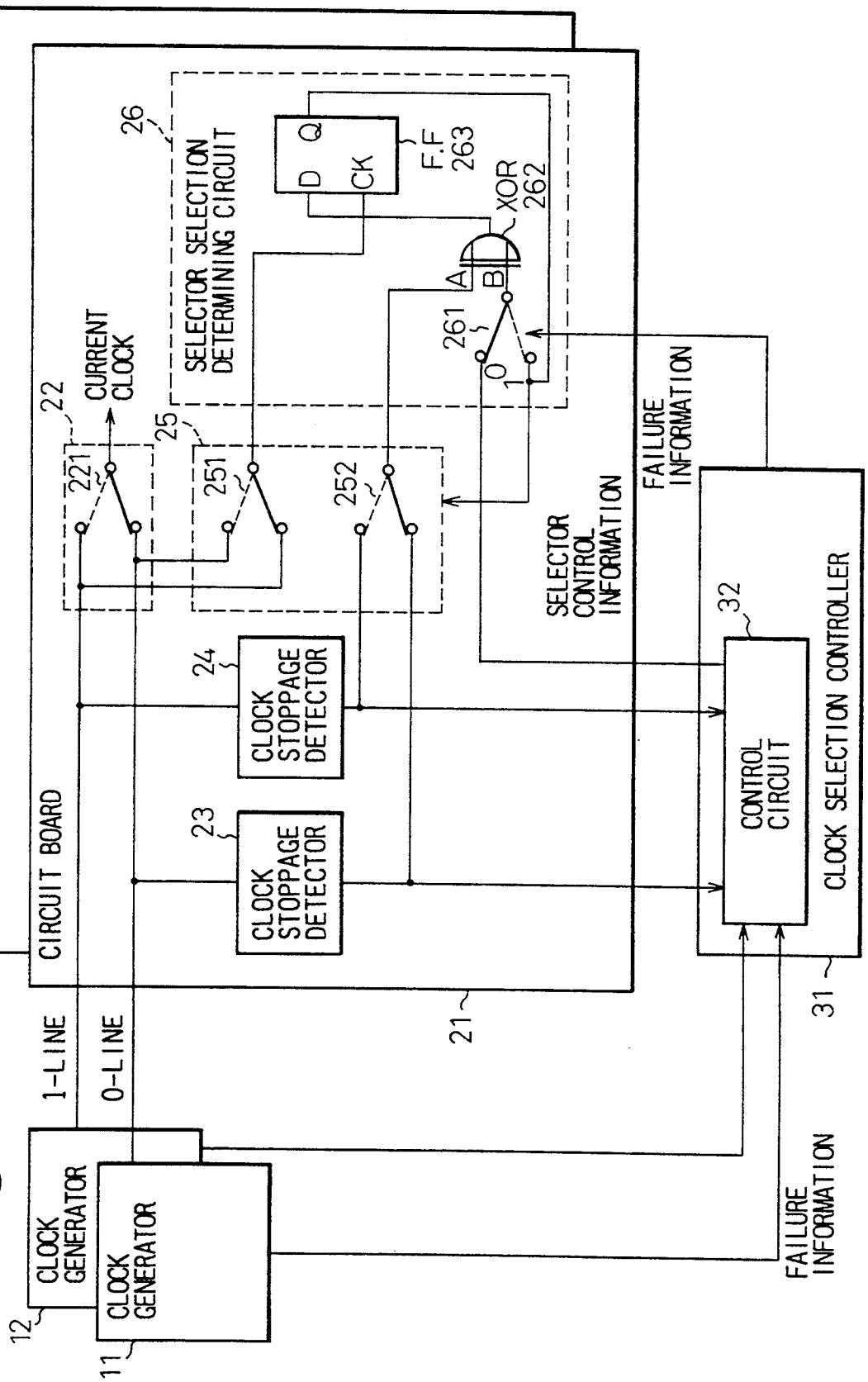

CLOCK SELECTION CONTROL DEVICE

BACKGROUND OF THE INVENTION

1. Field of the Invention

The present invention relates to a device for controlling clock selection in a redundant clock system and, more particularly, to a clock selection control device designed to prevent the selection of a failed clock and the stoppage of device functions in the event of failure of a clock selection controller.

2. Description of the Related Art

In recent years, transmission/communication apparatus, information processing apparatus and other equipment for processing digital signals have been increasing in functional complexity, in accordance with which enhancing system reliability has become a major consideration in designing these apparatus. To achieve this, techniques have been employed wherein the master clock of the device is designed with a redundant circuit and, within each device section operated by the clock, control is performed for the selection between the current and spare clock in the event of clock failure.

In one such redundant master clock selection system, a selector for selecting a clock is provided within each device section, and a clock selection controller is provided common to the entire device. In such a system, information concerning the detection of a clock stoppage at the selector input in each device section is supplied to the clock selection controller, which then makes a decision as to which of the clocks is to be selected. Based on this decision, the clock selection controller supplies selector control information to the device section. In accordance with the selector control information, the selector within the device section switches the clock path from the current clock to the spare clock.

The above prior art clock selection system, however, has had the problem that if the clock selection controller becomes faulty, or if the clock selection controller is disconnected during maintenance or is not connected correctly for operation, for example, the switching by the selector in each device section may not be accomplished properly, resulting in the stoppage of device functions.

SUMMARY OF THE INVENTION

In view of the above problem with the prior art, it is an object of the present invention to prevent the stoppage of functions of each device section due to clock selection failure, by employing a configuration in which a selector for selecting a clock in each device section is normally controlled on the basis of selector control information supplied from a clock selection controller, and in the event of failure, disconnection, or other trouble of the clock selection controller, the switching operation of the selector is controlled on the basis of a decision independently made within each device section.

According to the present invention, there is provided a clock selection control device for selecting one of two clock signals supplied to each of a plurality of circuit units in parallel to each other, comprising: clock selection control means, connected to the sources of the two clock signals as well as to the plurality of circuit units, for determining a clock signal to be selected and for supplying to each of the plurality of circuit units control information directing the selection of the thus determined clock signal; a plurality of clock failure detecting means, respectively connected to the plurality of circuit units, for detecting an abnormality in the clock signal being supplied to each of the plurality of circuit units and for outputting a clock failure signal when abnormality is detected; and a plurality of selection determining means respectively connected to the plurality of circuit units, each selection determining means changing the clock signal selection independently of the control information, when the clock failure signal is output in the clock signal selected in the circuit unit connected thereto.

BRIEF DESCRIPTION OF THE DRAWINGS

FIG. 3 is a block diagram showing the embodiment of FIG. 2 in further detail.

DESCRIPTION OF THE PREFERRED EMBODIMENTS

Before describing the preferred embodiments according to the present invention, examples of the related art are given with reference to the accompanying drawings.

Figure 1:
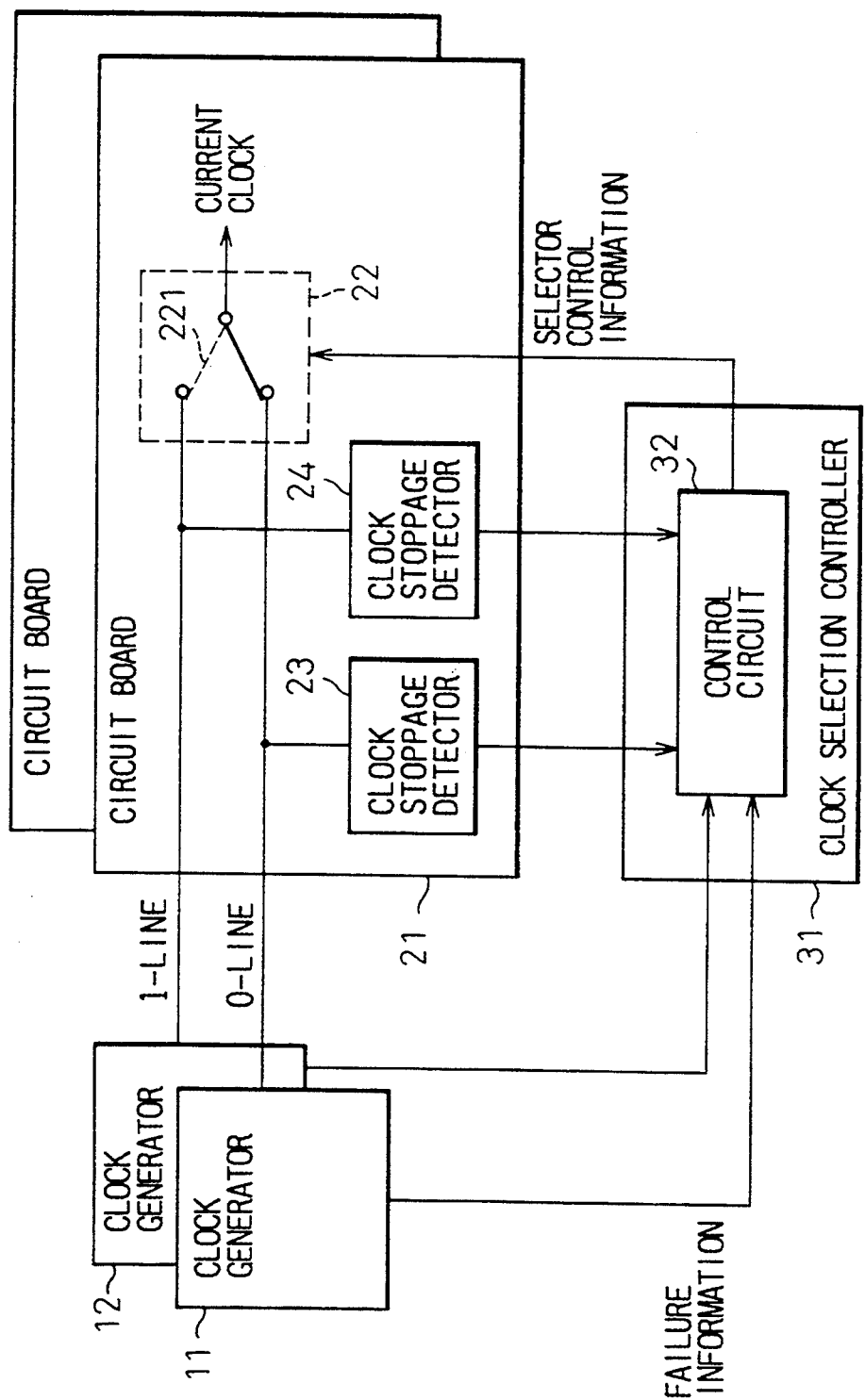
FIG. 1 is a block diagram showing a clock selection control system of the prior art.

FIG. 1 shows a clock selection control system according to the prior art. In the figure, the numerals 11 and 12 designate clock generators that generate a 0-line clock and a 1-line clock, respectively. The numeral 21 indicates a circuit board that uses the clock for operation; in the figure, one of a plurality of circuit boards is shown as a representative example. The clock generators 11 and 12 supply the respective clocks via parallel paths to each circuit board.

In the circuit board 21, the numeral 22 indicates a clock input selector having a selector switch 221; based on selector control information, the selector switch 221 is switched to select either the 0-line clock input or the 1-line clock and supply the operating clock to various parts within the circuit board. The numerals 23 and 24 designate clock stoppage detectors which generate clock stoppage detection information by detecting stoppage of the 0-line clock and the 1-line clock, respectively. In some configurations, the circuits 23 and 24 are each configured to output a clock failure signal by detecting not only a clock stoppage state but also abnormality in the durations of the high and low level periods.

The numeral 31 designates a clock selection controller for controlling the switching operation of the clock input selector 22 on each circuit board. In the clock selection controller 31, the numeral 32 indicates a control circuit which makes a decision as to which of the clocks is to be used on the basis of failure information from the clock generators 11 and 12 and clock stoppage detection information from the clock stoppage detectors 23 and 24, and which outputs the selector control information to control the switching operation of the clock input selector 22 in accordance with the thus made decision.

Suppose here that the clock input selector 22 selects the 0-line clock from the clock generator 11 and supplies this clock to the internal parts of the circuit board, the 1-line clock from the clock generator 12 being reserved as the spare clock. In this situation, if the clock generator 11 becomes faulty, or if a clock stoppage state is detected by the clock cutoff detector 23, the control circuit 32 then outputs the selector control information to direct the clock input selector 22 to switch to the alternative clock input, as a result of which the 1-line clock is now supplied to the internal parts of the circuit board as the current clock while the 0-line clock is reserved as the spare clock.

The clock selection control system of the prior art such as shown in FIG. 1, however, has had the problem that if the clock selection controller 31 becomes faulty, or if the clock selection controller 31 is disconnected during maintenance or is not connected correctly for operation, for example, the switching by the selector in each section may not be accomplished properly, resulting in the stoppage of device functions.

Figure 2:
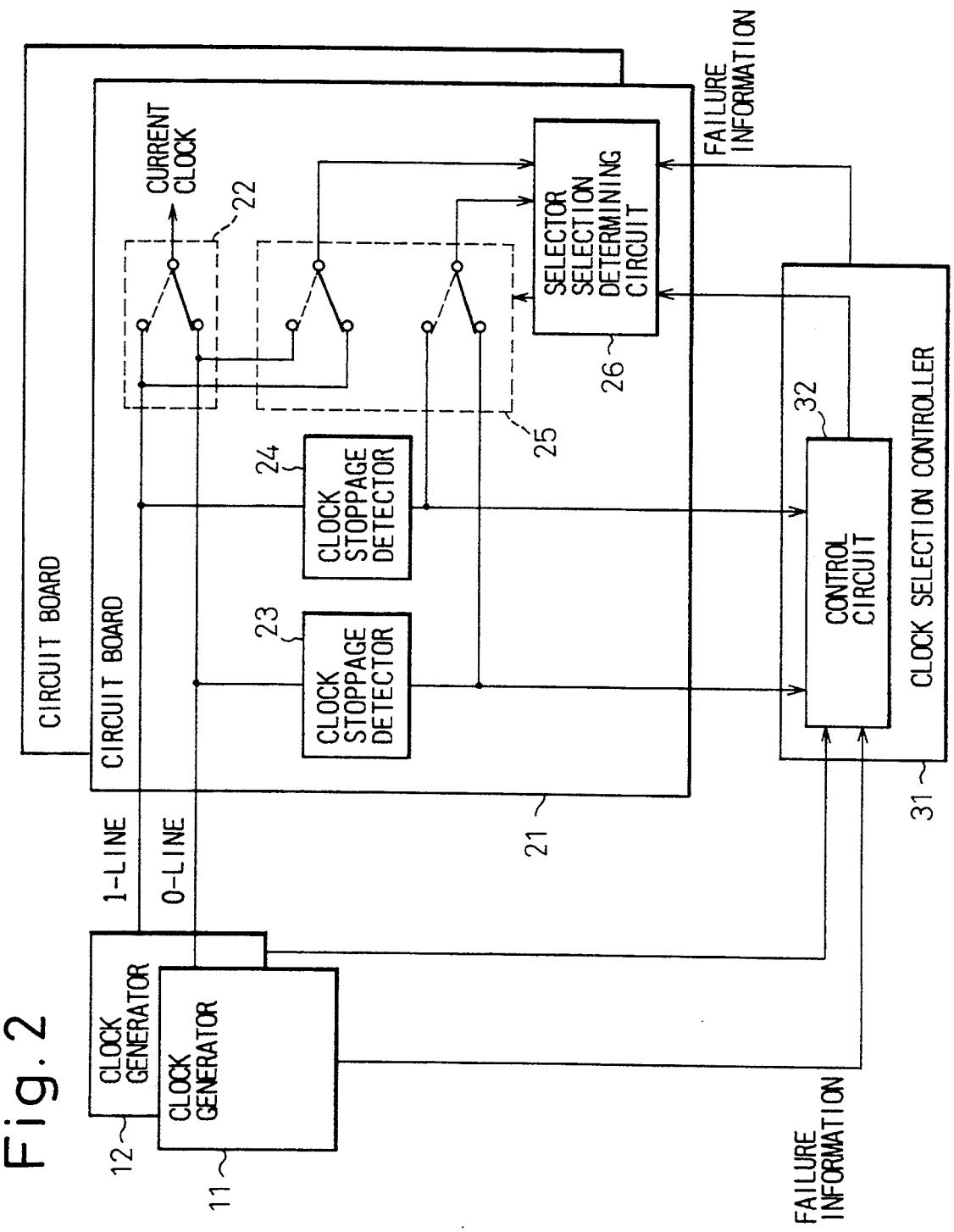
FIG. 2 is a block diagram showing one embodiment of the present invention.

FIG. 2 is a block diagram showing one embodiment of the present invention. The same parts as those shown in FIG. 1 are designated by the same numerals; the functions of such parts are the same as those of the corresponding parts shown in FIG. 1. The numeral 25 indicates a decision input selector which performs switching for selection, in an interlinked fashion with the clock input selector 22, and outputs the spare clock after the selection and uses the clock stoppage detection information for the current clock as information for decision. The numeral 26 designates a selector selection determining circuit which has the function of controlling the switching operation of the selector in the event of failure, disconnection or other trouble at the clock selection controller.

The selector selection determining circuit 26 makes corrections to the selector control information supplied from the control circuit 32 by receiving the current clock stoppage detection information, the spare clock from the decision input selector 25, and the failure information from the clock selection controller 31, and generates control information directing the clock input selector 22 and the decision input selector 25 to perform switching.

FIG. 3 is a diagram showing the selector selection determining circuit 26 of FIG. 2 in further detail, wherein the same parts as those shown in FIG. 2 are designated by the same numerals. In the decision input selector 25, the numerals 251 and 252 are selector switches; the selector switch 251 selects the input clock between the 0 and 1 lines, working in an opposite relationship to the selector switch 221, and thus outputs the spare clock, while the selector switch 252 switches its input between the output of the 0-line clock stoppage detector 23 and the output of the 1-line clock stoppage detector 24, working in a coincidental relationship to the selector switch 221, and thus outputs the current clock stoppage detection information.

In the selector selection determining circuit 26, the numeral 261 is a control input selector, 262 is an exclusive-OR circuit (XOR), and 263 is a flip-flop (FF). The control input selector 261 switches its input between input 0 at which the selector control information from the clock selection controller 31 is applied and input 1 at which an output from the flip-flop 263 is applied, on the basis of the failure information supplied from the clock selection controller 31, and applies its output to one input B of the exclusive-OR circuit 262.

The output of the selector switch 252 is coupled to the other input A of the exclusive-OR circuit 262 whose output is then applied to a data (D) input of the flip-flop 263. The output of the selector switch 251 is applied to a clock (CK) input of the flip-flop 263 whose output is not only fed back to the input 1 of the control input selector 261 but is also supplied to the clock input selector 22 and decision input selector 25 as the control information.

In FIG. 3, the solid lines shown in the clock input selector 22 and decision input selector 25 indicate the condition in which the 0-line clock from the clock generator 11 is selected as the current clock; on the other hand, the dotted lines indicate the condition in which the 1-line clock from the clock generator 12 is selected as the current clock. The operational description hereinafter given is based on the former condition, but the principle is the same when the 1-line clock is selected as the current clock.

In the following description, it is assumed that the clock stoppage detection information from the clock stoppage detectors 23 and 24 are "H" when a clock stoppage occurs and "L" when the clock is operating normally. Further, the failure information from the clock selection controller 31 is "L" to indicate no failure and "H" to indicate the occurrence of failure. Similar failure information is supplied from the detectors not shown when the clock selection controller 31 is disconnected or is not connected correctly. The control information supplied to the clock input selector 22 and decision input selector 25 is "H" for the 0-line clock and "L" for the 1-line clock. Also, the control input selector 261 is switched to the "0" input side when the failure information is "L", and to the "1" input side when the failure information is "H".

(1) In normal operation, the failure information from the clock selection controller 31 is "L", so that the control input selector 261 is set to the "0" input side. At this time, since the clock stoppage detection information from both the clock stoppage detectors 23 and 24 is "L", the one input A of the exclusive-OR circuit 262 is held at "L". The flip-flop 263 latches the selector control information from the control circuit 32 in synchronism with the spare clock supplied via the selector switch 251; therefore, the clock input selector 22 and the decision input selector 25 are switched in accordance with the selector control information.

(2) In the event of failure of the clock selection controller 31, the failure information is set to "H", causing the control input selector 261 to switch to the "1" input side. As a result, the selector selection determining circuit 26 is allowed to operate independently of the selector control information supplied from the clock selection controller 31. In this case, as long as the current clock is operating normally, the A input of the exclusive-OR circuit is "L", so that the state of the output agrees with the state of the B input. As a result, the state of the Q output of the flip-flop 263 coincides with the state of the D input thereof, and the state of the flip-flop 263 does not change when the clock is applied. The switching state of the clock input selector 22 and decision input selector 25 is thus retained.

(3) When the 0-line clock that has been providing the current clock stops, the clock stoppage detection information from the clock stoppage detector 23 is set to "H", so that the A input of the exclusive-OR circuit 262 changes to "H". As a result, the output of the exclusive-OR circuit 262 is inverted; if, at this time, the 1-line clock is operating normally, since the state of the flip-flop 263 is inverted, the clock input selector 22 and the decision input selector 25 are switched upon the inversion of the control information so that the 1-line clock is now output as the current clock.

When the 0-line clock and the 1-line clock are both cut off, no change occurs in the state of the flip-flop 263, so that the clock input selector 22 and the decision input selector 25 are not switched.

(4) When the clock selection controller 31 becomes faulty, if no failure information is output, the control input selector 261 remains connected to the "0" input side where the selector control information from the clock selection controller 31 is selected. However, whether this selector control information is normal or not is unknown. At this time, if the clock stoppage detection information is active for the 0-line that provides the current clock, then the A input of the exclusive-OR circuit 262 coupled to the selector switch 252 is "H". As a result, the selector control information from the clock selection controller 31 is inverted and input to the flip-flop 263, and provided that the spare 1-line clock is operating normally, the state of the flip-flop 263 is inverted, causing the clock input selector 22 and decision input selector 25 to switch to select the 1-line clock which is now output as the current clock.

In this case also, when the 0-line clock and the 1-line clock both stopped, no change occurs in the state of the flip-flop 263, so that the clock input selector 22 and the decision input selector 25 are not switched.

I claim:

1. A clock selection control device for selecting one of two clock signals supplied to each of a plurality of circuit units in parallel to each other, comprising:

clock selection control means, connected to the sources of said two clock signals and to said plurality of circuit units, for determining a clock signal to be selected and for supplying to each of said plurality of circuit units control information directing the selection of said determined clock signal;

a plurality of clock failure detecting means, respectively connected to said plurality of circuit units, for detecting an abnormality in the clock signal being supplied to each of said plurality of circuit units and for outputting a clock failure signal when an abnormality is detected; and a plurality of selection determining means respectively connected to said plurality of circuit units, each selection determining means changing the clock signal selection independently of said control information, when said clock failure signal is output for the clock signal selected in the circuit unit connected thereto.

2. A clock selection control device according to claim 1, wherein in the event of failure of said clock selection control means, failure information is input to each of said plurality of selection determining means, and wherein the selection determining means determines the clock signal selection independently of said control information, in response to said failure information.

3. A clock selection control device according to claim 1 or 2, wherein said selection determining means are each allowed to independently change the clock signal selection only when the unselected clock signal is operating normally.

4. A clock selection control device according to claim 3, further comprising: a first switch for selecting one of said two clock signals under control of said selection determining means to thereby supply the selected clock signal to said circuit unit; and a second switch, operating in an interlinked fashion with said first switch, for selecting a clock failure signal pertaining to the selected clock signal to thereby supply the selected clock failure signal to said selection determining means.

5. A clock selection control device according to claim 4, further comprising a third switch, operating in an interlinked fashion with said first and said second switch, for supplying a clock signal which is not selected by the first switch to said selection determining means, wherein said selection determining means changes the clock selection using the clock signal supplied via said third signal as an operation clock.

6. A clock selection control device according to claim 5, wherein said selection determining means includes a fourth switch which is controlled by said failure information and which selects said control information when said failure information is not input and selects information pertaining to the result of the selection by said selection determining means when said failure information is input.

7. A clock selection control device according to claim 6, wherein said selection determining means further includes: an exclusive-OR circuit which accepts the clock failure signal selected by said second switch at one input and the information selected by said fourth switch at the other input thereof; and a flip-flop circuit to which an output from said exclusive-OR circuit is supplied as a data input and the clock signal selected by said third switch is supplied as a clock input, and which outputs information pertaining to the result of the selection.

* * * * *